Patented Dec. 1, 1925.

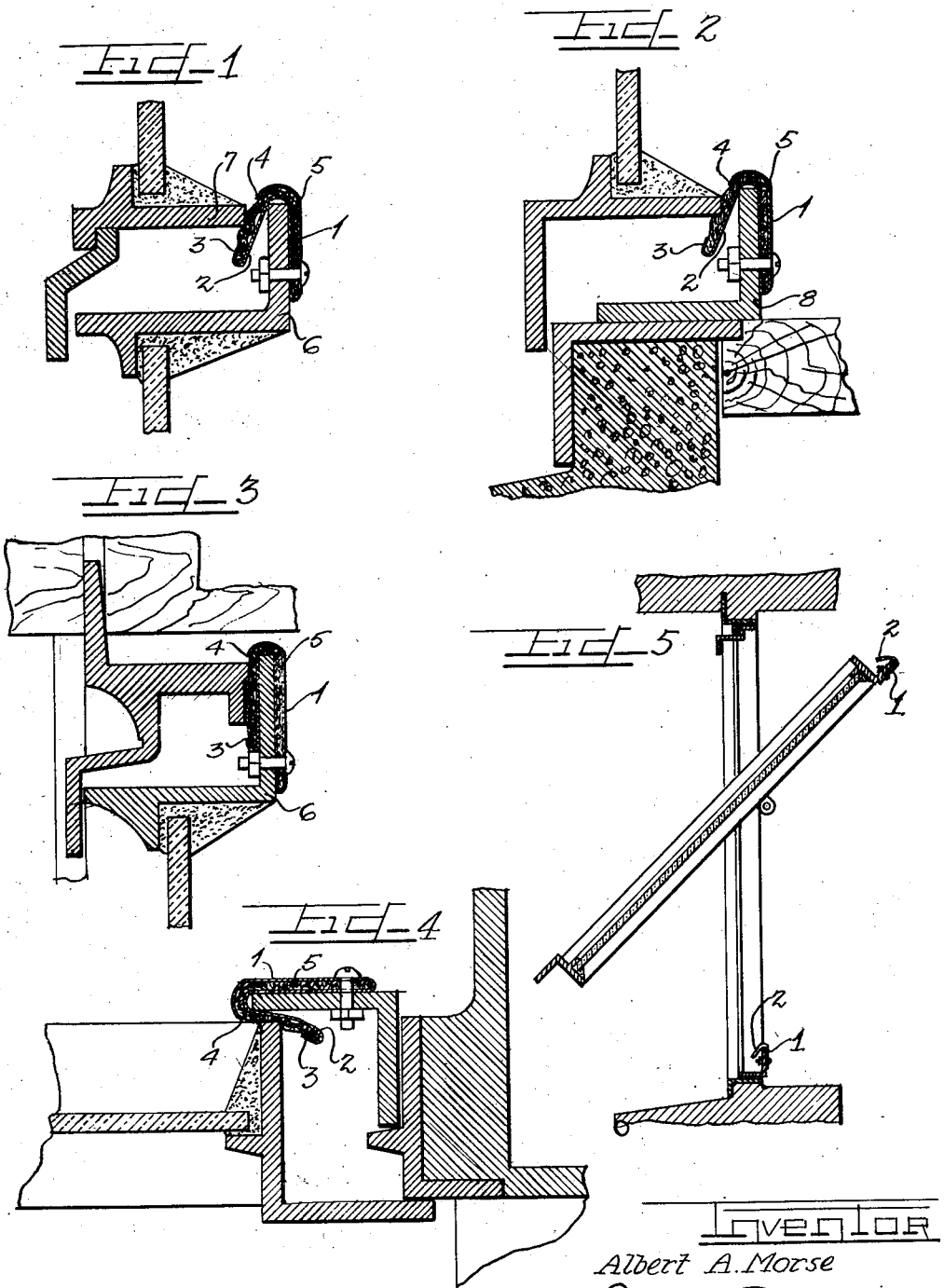

1,564,182

UNITED STATES PATENT OFFICE.

ALBERT A. MORSE, OF CHICAGO, ILLINOIS, ASSIGNOR TO ATHEY COMPANY, A CORPORATION OF ILLINOIS.

WEATHER STRIP.

Application filed April 14, 1924. Serial No. 706,277.

*To all whom it may concern:*

Be it known that I, ALBERT A. MORSE, a citizen of the United States, and a resident of the city of Chicago, in the county of Cook and State of Illinois, have invented certain new and useful Improvements in a Weather Strip; and I hereby declare that the following is a full, clear, and exact description of the same, reference being had to the accompanying drawings, and to the numerals of reference marked thereon which form a part of this specification.

This invention relates to a weather strip adapted for use in connection with swinging windows or the like.

It is an object of this invention to provide a weather strip capable of withstanding the weathering elements, and which presents a soft or pliable surface to the contacting surface against which it is brought against to preclude the weather from entering, and which can be readily applied to a stationary or movable part.

The invention comprises the novel structure and combinations hereinafter described and more particularly pointed out and defined in the appended claims.

In the accompanying drawings which illustrate a preferred embodiment of this invention and in which similar reference numerals refer to similar features in the different views.

Figure 1 is a sectional view through the juncture of a pair of windows illustrating the weather strip.

Figure 2 is a sectional view through the lower portion of a window and sill therefor showing the weather strip applied to the stationary sill member.

Figure 3 is a sectional view through the upper portion of a window construction showing the application of the weather strip.

Figure 4 is a sectional view thru a portion of a horizontal window and its jam embodying a weather strip involving the invention.

Figure 5 is a reduced sectional view through a pivoted window showing the use of my invention.

The illustrated weather strip involving this invention consists of a metal sheath 1 partially folded to straddle a flange or plate. In other words, it has a downwardly inclined resilient or yielding flange 2; the edges of the metal which forms the sheath are in spaced relation as indicated at 3 and 4; the edge 3 constitutes a re-bent margin of the downwardly inclined flange 2, while the edge 4 is bent over and around the crest or top of the sheath. A soft pad 5 of any suitable fibrous material as felt is enclosed in the sheath, the part protruding between the edges 3 and 4 of the metal sheath being adapted for contacting relation with an abutment which may be stationary or may constitute the rail of a window sash.

The weather strip may be attached to the upper or lower members of a window frame or one may be attached to the window rail. The supporting member for the weather strip should generally be in the form of a flange or the like over which the strip may be placed, and secured. In attaching this weather strip, it is simply superposed upon such supporting flange, and the straight side of the strip is bolted or secured to one side of the flange, while the inclined flange of the strip projects freely upon the opposite side of such supporting flange.

In Figure 1, the weather strip is shown as attached to the upper rail 6 of a lower window section and in abutting relation with the lower rail 7 of an upper window section.

In Figure 2, the weather strip is shown as attached to an angle 8 extending lengthwise of the bottom of the window opening and the lower rail of the window sash is adapted to abut against the downwardly inclined flange 2. Numerous applications may be made of the weather strip as shown in Figs. 3 and 4. In Fig. 5, a single pivoted window is shown. The upper window rail is provided with an upstanding flange to which the weather strip is attached. Another weather strip may be attached upon the upstanding flange of an angle iron secured in the base of the window frame.

It will be appreciated that when a window equipped with my improved weather strip is closed, the impact of its upper and lower rails will be absorbed by the protruding portion of the pad 5 especially as the dowardly inclined flange 2 is capable of yielding. The yielding characteristics of the pad 5 and of the inclined flange 2 are conducive to forming a weather tight joint in relation to the part with which the same are brought into abutting relation.

I am aware that many changes may be made, and numerous details of construction may be varied through a wide range without departing from the principles of this invention, and I therefore do not purpose limiting the patent granted hereon otherwise than necessitated by the prior art.

I claim as my invention:

1. A weather strip comprising a metal sheath partially folded for straddling an object, whereby two spaced flanges are provided; the longitudinal edges of the metal forming said sheath being spaced apart upon the exterior side of one of said flanges, and a pad confined in said sheath and projecting between said spaced edges.

2. A weather strip comprising a metal sheath having a flange adapted for attachment to one side of an object and having a returned-bent flange projecting upon the other side of said object, and a pad confined in said sheath and being exposed upon the exterior surface of said returned-bent flange.

In testimony whereof I have hereunto subscribed my name.

ALBERT A. MORSE.